United States Patent Office 2,802,838
Patented Aug. 13, 1957

2,802,838

TETRAHYDROFURFURYL-N-METHYL CARBAMATE

Archie J. Deutschman, Jr., Columbus, Kans., and Willard C. Bull, Joplin, Mo., assignors to Spencer Chemical Company, Kansas City, Mo., a corporation of Missouri No Drawing. Application December 1, 1953, Serial No. 395,599

2 Claims. (Cl. 260—347.4)

This invention relates to the discovery of a new and useful compound, tetrahydrofurfuyl-N-methyl carbamate, represented by the following formula

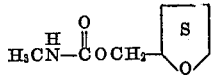

This compound has been found to be of particular utility as a plant growth regulator. This application is a continuation-in-part of our co-pending application Serial No. 177,066, filed August 1, 1950, which issued May 4, 1954, as Patent 2,677,698.

The following example will serve to illustrate the preparation of the aforementioned compound.

Example 79.0 (0.9 mole) 1,3-dimethylurea and 918 gms. (9.0 moles) tetrahydrofurfuryl alcohol were heated together at 200° C. under autogenous pressure for 17 hours. Fractional distillation of the reaction mixture gave 29.0 gms. of product boiling at 100°–105° C./2 mm. Hg, M. P. —70° C., $n_D^{20}$=1.4639.

What is claimed is:

1. Tetrahydrofurfuryl N-methyl carbamate having a boiling point of 100°–105° C./2 mm. Hg and a melting point of —70° C.

2. A method of preparing tetrahydrofurfuryl N-methyl carbamate consisting of heating 1,3 dimethyl urea with an excess of tetrahydrofurfuryl alcohol at a temperature of about 200° C. and separating the tetrahydrofurfuryl N-methyl carbamate from the reaction mixture.

References Cited in the file of this patent

UNITED STATES PATENTS

| | | |
|---|---|---|
| 2,161,615 | Deetrich | June 6, 1939 |
| 2,293,034 | Moore | Aug. 18, 1942 |
| 2,628,249 | Bruno | Feb. 10, 1953 |

OTHER REFERENCES

Ordmann: Berichte 35, 1859–1861 (1902).
Weenhaus: Berichte 53, 1662–3 (1920).